Figure 30:
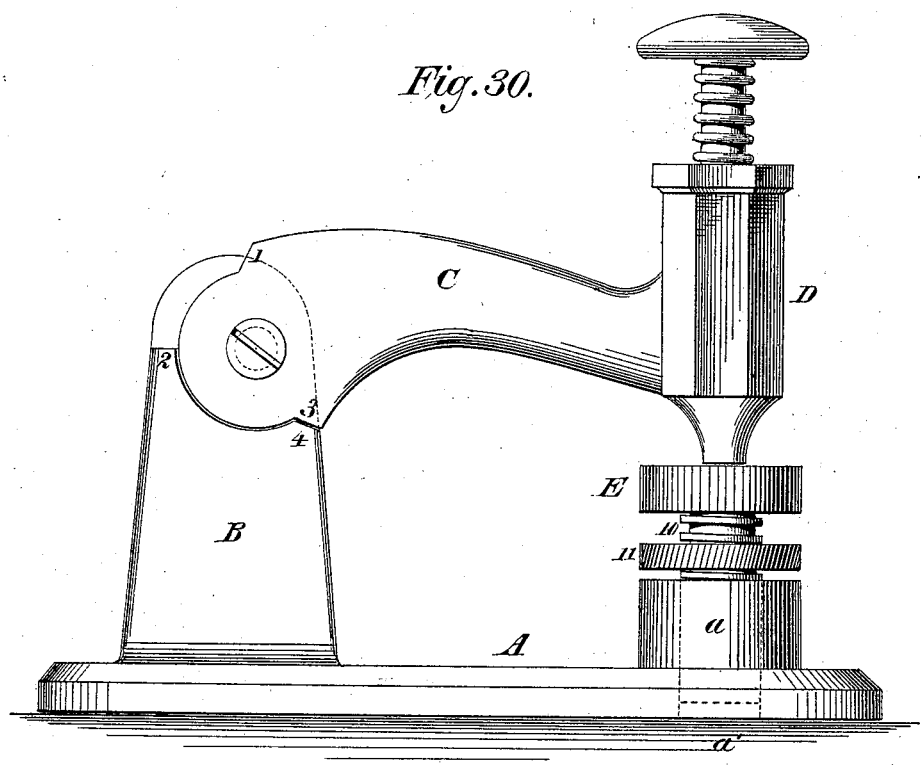

G. W. McGILL.
Device for Inserting Metallic-Staples in Paper, &c.
No. 212,316. Patented Feb. 18, 1879.
4 Sheets—Sheet 1.
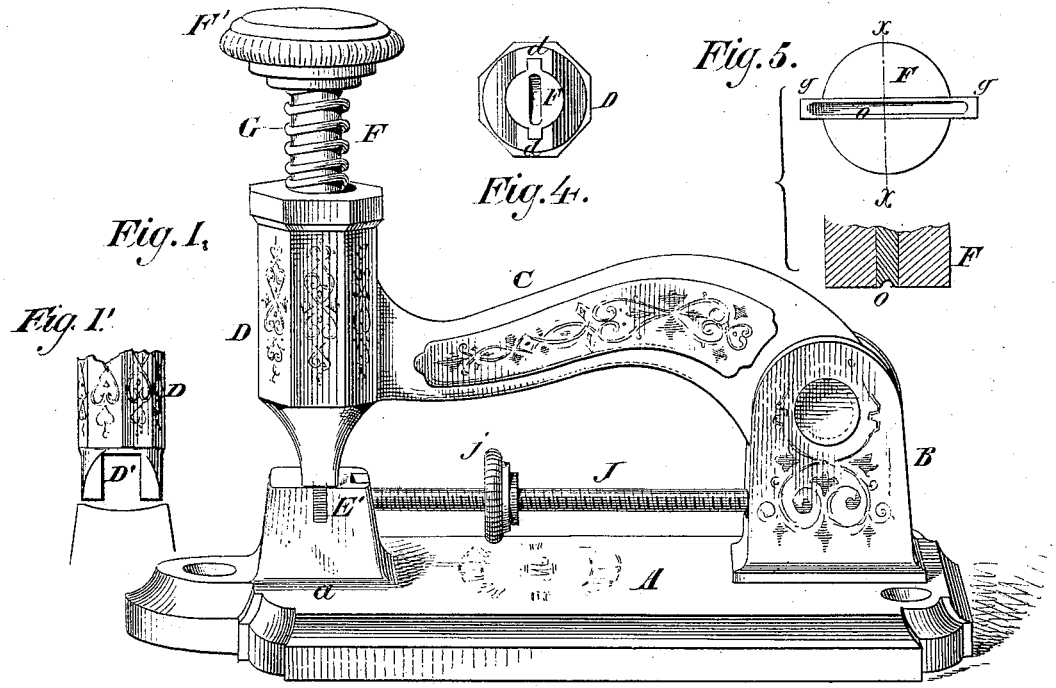
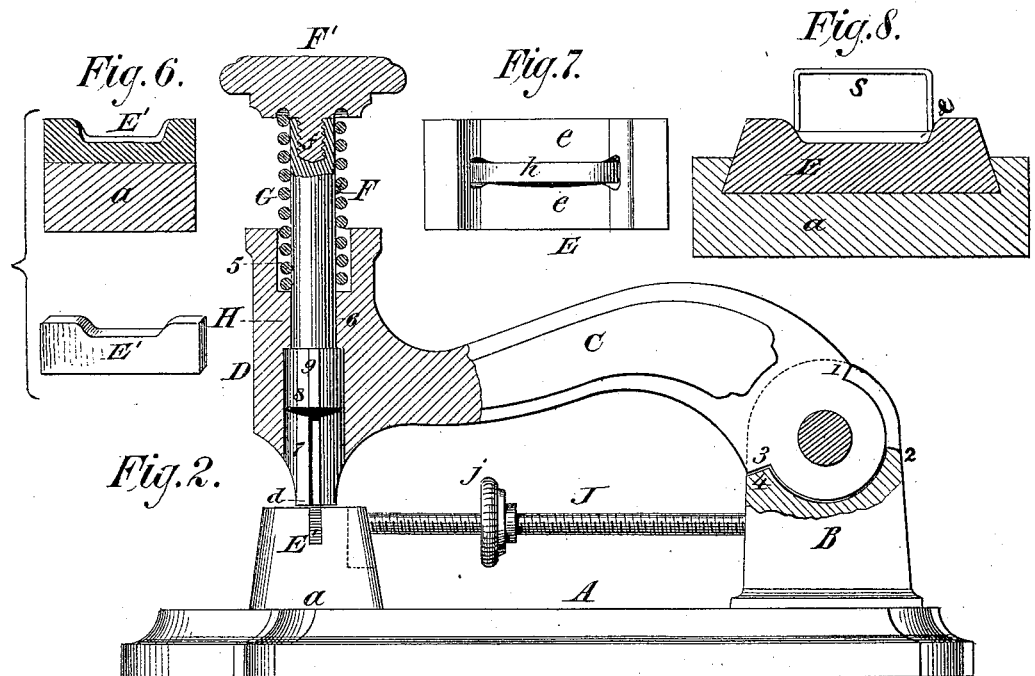
Witnesses.
Gustav Dieterich
Vinton Coombs
Inventor.
George W. McGill 4 Sheets—Sheet 2.
G. W. McGILL.
Device for Inserting Metallic-Staples in Paper, &c.
No. 212,316. Patented Feb. 18, 1879.
Fig. 3.
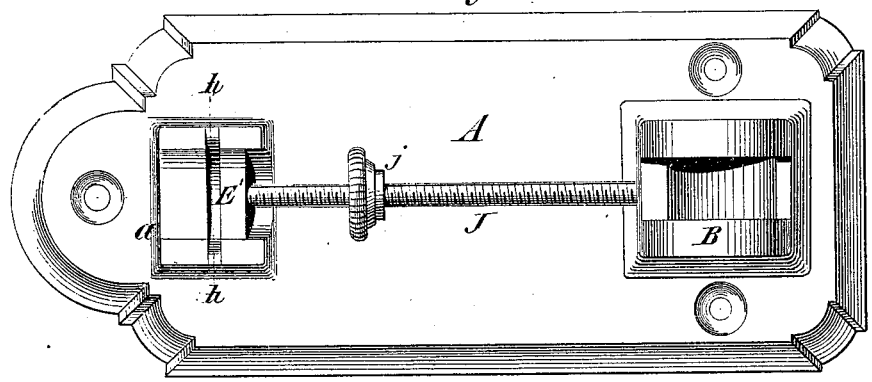
Fig. 9.
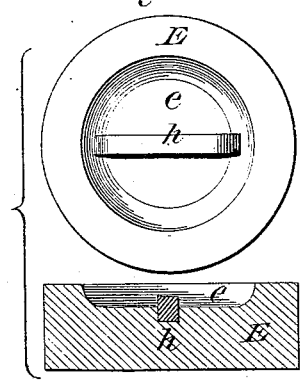
Fig. 11.
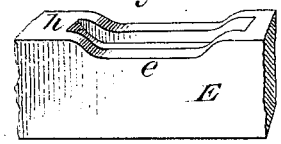
Fig. 12.
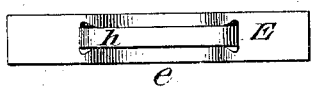
Fig. 10.
Fig. 13.
Fig. 14.
Fig. 15.
Fig. 16.
Fig. 17.
Fig. 18.
Fig. 19.
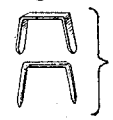
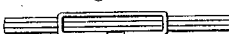
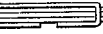
Fig. 26.
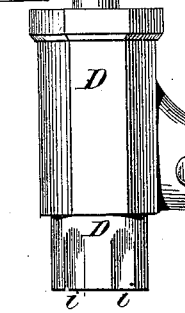
Fig. 20.
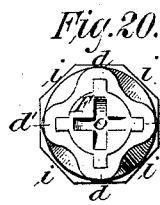
Fig. 21.
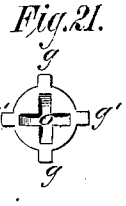
Fig. 22.
Fig. 25.
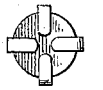
Witnesses.
Gustave Dietrich
Vinton Coombs
Inventor:
George W. McGill 4 Sheets—Sheet 3.
G. W. McGILL.
Device for Inserting Metallic-Staples in Paper, &c.
No. 212,316. Patented Feb. 18, 1879.
Fig. 23.
Fig. 24.
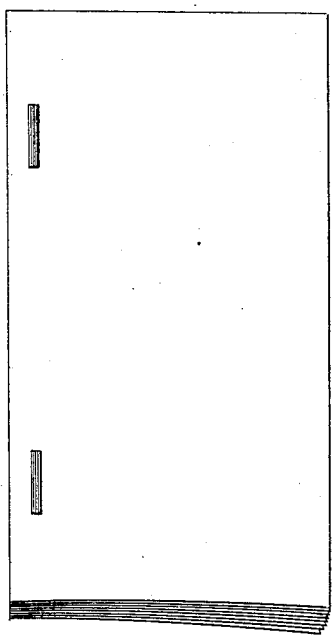
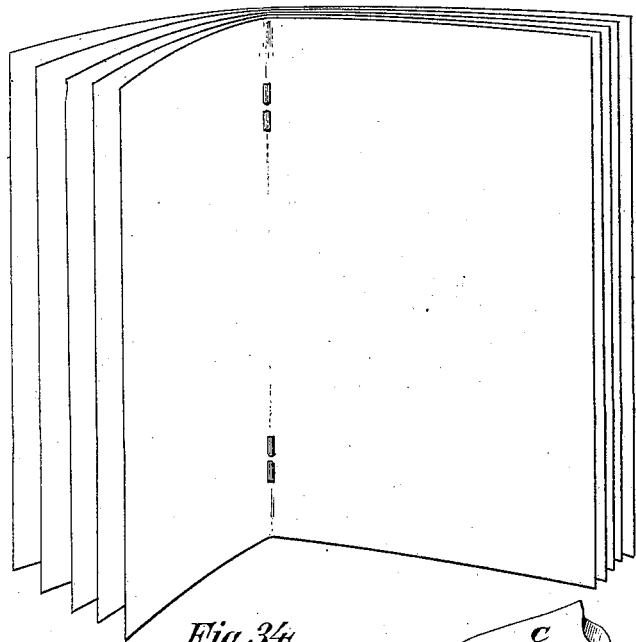
Fig. 27.
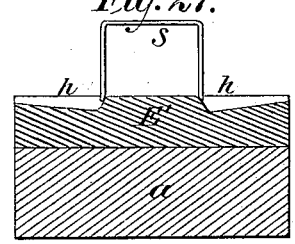
Fig. 28.
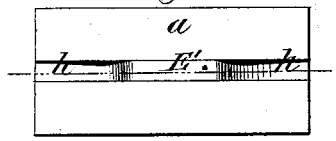
Fig. 29.
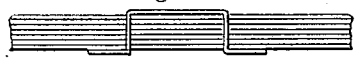
Fig. 34.
Fig. 33.
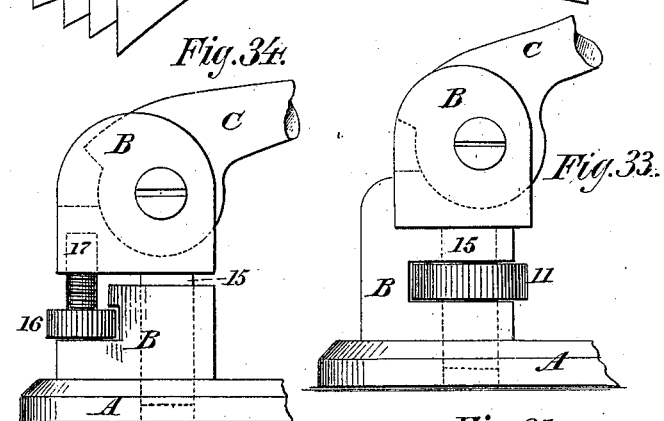
Fig. 32.
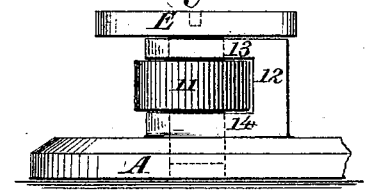
Fig. 31.
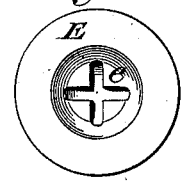
Witnesses.
Gustave Dieterich
Vinton Coombs
Inventor.
George W. McGill 4 Sheets—Sheet 4.

G. W. McGILL.
Device for Inserting Metallic-Staples in Paper, &c.

No. 212,316. Patented Feb. 18, 1879.

Witnesses.
Gustave Dieterich
Vinton Coombs

Inventor.
George W. McGill

UNITED STATES PATENT OFFICE.

GEORGE W. McGILL, OF NEW YORK, N. Y.

IMPROVEMENT IN DEVICES FOR INSERTING METALLIC STAPLES IN PAPERS, &c.

Specification forming part of Letters Patent No. 212,316, dated February 18, 1879; application filed January 9, 1879.

*To all whom it may concern:*

Be it known that I, GEORGE W. McGILL, of the city and county of New York, in the State of New York, have invented a new and useful Device for Inserting Metallic Staples in Papers, &c., for the purposes of binding, of which the following is a description:

The principal object of my invention is to effect the insertion and clinching of a staple in sheets of paper, pamphlets, or other articles to be bound, by one continuous and instantaneous operation or movement of the device.

My invention in the present instance is arranged as a hand-press; and consists of a bed-plate, furnished at its front end with a clinching-anvil, and at its rear with a pillar, in which is pivoted one end of a lever-arm, the other end of which is provided with the mechanism for inserting the staple in the articles to be bound, and which, in connection with the anvil, clinches the staple in said articles.

In the accompanying four sheets of drawings, Figure 1 represents a side elevation of the device in perspective, consisting of a bed-plate, A, anvil $a$, clinching-anvil blade E', lever-pillar B, lever C, case D, plunger F, spiral spring G, and screw-gage J. Fig. 2 is a longitudinal section of the device; and Fig. 1' is a front view of the lower part of case D. Fig. 3 is a plan view of the bed-plate, clinching-anvil plate and lever-pillar. Fig. 4 is a bottom view of the case D, with the plunger F inserted. Fig. 5 is a bottom view and vertical section of the face of the plunger F, enlarged. Fig. 6 is a cross-section of the anvil $a$, with its clinching-blade E' inserted, and also a side view in perspective of the clinching-blade; and Fig. 10 is a perspective view of this anvil complete. Figs. 7, 8, 9, 11, 12, and 13 show the clinching-anvil plate E, constructed in a manner that the one and same blow which inserts the staple in the object being bound will clinch its penetrating-points on the other side of the same. Figs. 14, 16, 17, and 18 represent different forms of staples which the device is adapted to insert; and Fig. 15 represents a staple as applied by the device, binding together the several sheets of paper. Fig 19 represents a side elevation of the case D, modified, for a purpose hereinafter described; and Figs. 20, 21, and 22 represent modifications in those parts of the device correspondingly lettered in the other figures. Figs. 23 and 24 represent two different modes of stapling pamphlets. Fig. 25 represents a four-legged staple adapted to be used in my device, modified as hereinafter described; and Fig. 26 represents the said staple with its shanks clinched. Fig. 27 is a top view of the anvil and blade E', showing a reversal of its mortising or grooving. Fig. 28 is a cross-section of the same, with a staple entering its grooves; and Fig. 29 represents a staple applied in binding, having its shanks clinched by being spread apart by this reversed grooving of the face of the clinching-blade E'. Figs. 30, 31, 32, 33, and 34 represent a further modification in the construction of those parts of the device correspondingly lettered in the other figures.

My invention consists of a metal bed-plate, A, provided at one end with an anvil, $a$, and at the other end with the mortised pillar B, connected together by a gage, consisting of a screw-bar, J, upon which a thumb-screw nut, $j$, revolves, intended and adapted to regulate, in binding, the line or point of stapling. In the mortised pillar B is pivoted one end of a lever-arm, C, arranged to swing up and down therein, the other end of which is provided with the vertical case D, in which is arranged the staple-driving mechanism. The anvil $a$ is provided with a steel clinching-plate, E', having its surface mortised or grooved, to clinch the staple-legs after the same have been driven through the articles being bound, or equivalently arranged without the plate E, as hereinafter described. The rear or hinging end of lever C is provided with the shoulders 1 and 3, to rest against corresponding shoulders 2 and 4 in the pillar B, to prevent it from being thrown too far back or dropped too far forward or down, which latter check is only required where the anvil or pillar is made adjustable, as will be explained hereinafter.

The staple-inserting mechanism consists of the case D, plunger F, and spiral spring G, which are constructed and put together as follows: The case D is provided with a cylindrical chamber, H, running vertically through its center, and divided into the sections 5, 6, and 7 by different degrees of diameter, its lower section, 7, being furnished with the staple-grooves $d\ d$, cut vertically in its opposite sides. The plunger F, which is intended to be moved up and down in the chamber H, consists of a cylindrical metal rod, having at its base an enlargement or foot, 8, which latter is provided on opposite sides with the feathers $g\ g$. The upper end of the plunger is provided with a cap, F', secured thereto by the screw-connection $f$. The cap F' being removed, the capping end of the plunger is run up through the chamber H, its foot occupying the upper portion of section 7 and the feathers $g\ g$ in the grooves $d\ d$. The spiral spring G is placed over the upper end of the plunger, and its lower portion, surrounding the same, passed down into section 5 of the chamber H. The cap F' is screwed onto the plunger, which locks both it and the spring G in the case D, as shown in the drawings. The first coil of the upper end of the spring G enters an annular groove in the under surface of the cap F', for its better security. The office of the spring G is to hold the plunger up in the chamber H, as shown in the drawings, and to bring it back to that position so soon as pressure is removed from its cap. The plunger F is of a length that, in connection with its spring G, on being pressed upon the bottom of its foot 8, will clear or pass down a little below the bottom of the case D. The bottom of the case D rests upon the face of the anvil-plate E. The bottom part of the case D, as shown in Figs. 1, 2, 4, and 30, is beveled transversely, to leave open the base of the chamber H, and to assist the eye of the operator in inserting the staple at the required point or line.

The device is operated as follows: The lever C is raised until its shoulder 1 rests on shoulder 2 of the pillar B, which brings it on a slant back of the pillar B, turning upward and exposing to the operator the grooved base of the chamber H. A metallic staple of suitable size is inserted in the grooves $d\ d$ in the foot of the case D, with its shanks pointing outward. The articles to be bound are laid upon the face of the anvil-plate E, and the case C dropped upon them, its weight holding them upon the anvil without preventing their being moved to any point desired under the case without the latter again being raised. The cap of the plunger being now struck or pressed upon, its feathered foot 8 is forced down upon the head of the staple, driving the shanks of the latter down out of the guiding and supporting grooves or staple-seats $d\ d$ through the articles placed upon the anvil. The points of the staple-shanks, after passing through the goods, are bent in toward each other, and clinched up against the under side of such articles by being further driven by the plunger into the mortises or grooves of the anvil-plate E, which accomplish this end by being shaped as follows: The face of the anvil-plate E is chamfered out to form a shallow channel or sunken chamber, $e$, with a flat bottom and flaring sides, as shown in Figs. 7, 8, 9, 11, 12, and 13, which are drawn on a large scale to better illustrate their formation. The flaring channel or ditch $e$ commences at its top with a diameter slightly wider than the staple-seat or chamber $d\ d$ in the case D, and with the position of which it corresponds, and flares sufficient to make the diameter of its flat bottom less than the diameter of the case-chamber H proper, as shown in the drawings.

The bottom of the channel $e$ is crossed by the transverse groove $h$, which is made slightly wider than the grooves $d\ d$ of the staple-seat, and with the position of which it corresponds, and of a depth to correspond to the thickness of the metal in the staple used. This cross-groove $h$ extends into the flaring sides of the channel or ditch $e$, and has its ends curved sharply downward from the upward portion of said flare, as shown in the drawings. The points of the shanks of the staple, on being driven through the objects being bound, strike the flaring sides of the channel $e$ above the cross-groove $h$, as shown in Fig. 8, where $s$ represents the staple, and, continuing down into said cross-groove $h$, are bent inward by its quickly-curved ends, and guided on the same line toward each other by the grooves proper; and the papers or other articles being bound, being forced down in the channel $e$ by the face of the plunger, further clinch and bend the lower part of the shanks of the staple until they lie flat against the under surface of such goods, with their points turned into the same.

The curved or chamfered ends of the cross-groove $h$, where the latter is sunk in the face of the anvil proper, and independently of the channel $e$, will be found somewhat too shallow to properly bend and clinch the staple-shanks up flat against the under surfaces of the articles being bound. The office of the channel $e$ is to admit the portion of the goods clasped by the staple being forced down into said channel, and thereby assist in the clinching of the staple-shanks, as hereinbefore described. The channel or chamber $e$ may be made round or cup-shaped, as shown in Fig. 9, wherein a plan or face view and a cross-section of the anvil-plate is shown; or the face of the plate may be chamfered out to form a channel or ditch with flaring sides, as shown in Figs. 7 and 8, Fig. 7 being a plan or face view, and Fig. 8 a cross-section, showing the position of the staple-shank when entering its flaring channel and cross-groove, as before described; or the anvil-plate may be given this form in the manner shown in Figs. 11, 12, and 13, wherein Fig. 11 represents a perspective view of the anvil-plate channeled and grooved in a manner equivalent to the other figures, Fig. 12 being a top or face view, and Fig. 13 a cross-section. The ends of the cross-groove $h$ of the anvil-plate are represented in the drawings flaring outward as well as upward. The object of their outward flare is to overcome any slight displacement of the staple-shanks in passing through the articles being bound.

The cheapest and consequently the preferable way of constructing this form of anvil-plate is shown in Figs. 1, 2, 3, and 6, wherein the upper surface of the anvil a is chamfered or ditched from front to back, as before described, and provided with a transverse slot, in which is inserted a blade, E'. This blade is ditched deeper than the face of the anvil, so that on being inserted in its transverse slot they jointly form the cross-groove $h$, for the reception and clinching of the points of the staple, as before described.

In a press having both its anvil and lever-pillar stationary, as shown in Figs. 1 and 2, the face of the anvil ought to occupy a line sufficiently low to cause the case D, when it rests upon it, to point out a little obliquely therefrom, leaving to the thickness of the object bound to bring it to a vertical position, or a position slightly oblique in an opposite direction, which arrangement facilitates the proper working of the device and the insertion of staples in articles of considerable thickness.

The face of the plunger F is provided with the cross groove or grooves O, extending across it on a line with and partially into the face of its feathers, its office being to assist in holding the staple in firm position while being inserted in the articles being bound, and throw the pressure of the plunger principally upon the shoulders of the staple-shanks.

The feathers $g$ $g$ may be cast or wrought on the foot of the plunger F; or the base of the plunger may be provided with a cross-slot, having a steel plate inserted therein, with its ends projecting beyond the sides of the plunger, as feathers therefor, as shown in Fig. 5. The enlargement of the base of the plunger, (foot 8,) and the consequent enlargement of the diameter of the lower portion of the case-chamber H, (section 7,) may be omitted, as the shoulders of the feathers $g$ $g$ will serve the same purpose, which is to properly limit the upward movement of the plunger in the case-chamber H; and the case-chamber and plunger may be made of a form other than cylindrical without interfering with the proper working of the device, so long as the shape of one corresponds to and fits the other.

It is manifest that this machine is adapted to insert and clinch staples of the various forms represented in Figs. 14, 16, 17, and 18, upon which staples, however, no claim is made.

A staple provided with almost any shape or struck-up form of head may be inserted with this device by mortising out the face of the plunger F, so that the bottom of its feathers will always rest on the top of the shanks or shoulders of the staple.

The staples herein shown and described form no part of my present invention.

The open slot D' in the face of case D, Fig. 1', gives room for an enlarged or extended head of the staple.

Figs. 19, 20, 21, and 22 represent a modification in parts of the device to enable it to receive and insert a staple on lines crossing each other at right angles, and adapt it to bind pamphlets, sheet-music, and other papers, in manner as shown in Figs. 23 and 24, Fig. 23 representing a pamphlet bound by having the staple passed through the inner margin of its folded leaves and clinched thereon, and Fig. 24 represents a pamphlet bound by having the staple passed through the center or fold of its sheets and longitudinal therewith, its clinching-points occupying the inside of the fold.

To accomplish this latter mode of binding, the entire foot of the case D is made cylindrical in form, as shown in Fig. 19, and not beveled to open the base of the chamber H, as shown in the other figures; and the section 7 of said chamber H is provided with an extra pair of staple-grooves, $d'$ $d'$, for the reception of a staple on a line longitudinal with the press, as shown in Fig. 20, which is a bottom view of the case D, having its chamber H so grooved, and a similar view of the plunger F inserted therein and correspondingly feathered, as is separately shown in Fig. 21, $g'$ $g'$ being its extra feathers.

The face of the anvil-plate E is provided with a corresponding extra groove, $h'$, as shown in Fig. 22.

A two-pronged staple being placed in the grooves $d'$ $d'$ in manner similar to that heretofore described, the pamphlet to be bound, as shown in Fig. 24, is placed on the anvil with its center fold over the groove $h'$, the staple-case lowered, and the staple inserted and clinched in the fold of the pamphlet by a blow upon the plunger-cap, as hereinbefore described.

This latter mode of stapling is especially adapted to news and illustrated papers, sheet-music, copy-books, &c., where it is desirable to have the leaves open to their full extent.

The vertical chamfers $i$ $i$ $i$ $i$, Figs. 19 and 20, on the outside of the foot of the case D, are intended for ornamentation and to assist the eye of the operator in getting the articles to be stapled in proper line under the staple.

Four-pronged staples, such as shown in Figs. 25 and 26, may be inserted with a press thus modified, and the press may be similarly modified to receive and insert staples of any number of prongs.

Fig. 28 represents a face view of the anvil-blade E' with its channeling or grooving reversed, so as to spread the staple-legs from each other instead of bending them in, as shown and described in the other figures, Fig. 27 being a longitudinal section of the same, taken on its line $x$ $x$, and showing a staple, S, entering the grooves, while Fig. 29 represents several sheets of paper bound with a staple so applied.

The advantage of this mode of clinching consists in its admitting the use of staples with long or short shanks in binding articles of the same bulk or thickness.

Figs. 30, 31, 32, 33, and 34 represent a modification in parts of the device, by means of which the lever-pillar B, or the anvil-plate E, or both, are made adjustable, to admit of their being raised or lowered, according to the thickness or bulk of the object through which the staple-shanks are being driven, causing the shanks to pass through such object in a direct vertical line, which greatly facilitates their insertion and the after-clinching of their ends or points on the anvil-plate. In a press having a short-lever arm, this construction will be found of advantage in binding objects of considerable volume or thickness.

The adjustable anvil shown in Fig. 30 is constructed as follows: In the anvil $a$ is formed the vertical cylindrical chamber $a'$, running down through it and the bed-plate A, (represented in dotted lines in the drawings,) and having its interior surface screw-threaded to receive the screw-base 10 of the anvil-plate E, which is inserted therein. The anvil-plate is raised and lowered, as desired, by turning it in opposite directions. It is set with the cross-grooves of its clinching-face under and corresponding with the staple-seat $d\ d$ of the case D, and is secured in such position by the set-screw nut 11.

Fig. 31 represents the face of the anvil-plate, with its clinching-grooves crossing each other in manner similar to that shown in Fig. 22, the object of such arrangement in the present instance being to bring one of its cross-grooves on a line under the staple-seat $d\ d$ of the case D with every quarter-revolution of the anvil-plate.

In Fig. 32 the anvil is represented constructed somewhat on the principle of a screw or monkey wrench, and possesses the advantage of having a fixed up-and-down movement, which obviates the necessity, on each change in the height of the anvil-plate, of setting its face-grooves to correspond to the staple-seat in the case D. In this instance the anvil proper consists of the upright 12, connecting the upper and lower jaws, 13 and 14. These jaws are pierced by a square hole or socket, through which passes the base 10 of the anvil-plate E, which in this instance is made square, with threaded corners to receive the set-screw nut 11, set between the jaws, and by means of which the plate is raised, lowered, and set in position. In a similar manner, and as an equivalent to the adjustable anvil, and to secure similar results, the pillar B of the device may be made adjustable, as is shown in Fig. 33, wherein the pillar is made in two pieces, its upper section, in which the lever C is pivoted, being provided with an extension, 15, similar to the base 10 of the anvil-plate described in Fig. 32, and its lower section constructed in a manner similar to the anvil proper in said figure, and operated therein by a corresponding set-screw nut, 11; or the pillar may be constructed as shown in Fig. 34, wherein the base-extension 15 of its upper section is made without the screw-edges described in the last figure, and is inserted in a square socket or chamber running vertically through the high or inner portion of the lower section of the pillar, and is moved up and down therein by the screw-bolt 16. The headed or lower end of the bolt is fixed in the lower or outer portion of the lower section of the pillar, so as to admit of its being revolved therein, but not removed therefrom. The other end of the bolt enters a screw-chamber, 17, in the upper or adjustable section of the pillar, as shown in the figure by dotted lines. Revolving the screw-bolt in one direction will raise the upper or adjustable section of the pillar, and a reverse movement will lower it.

What I claim as my invention is—

1. The vibrating lever C, case D, chamber H, with grooves $d\ d$, plunger F, with feathers $g\ g$, and spring G, in combination with the anvil $a$, having on its face a sunken channel, $e$, and transverse groove $h$, all constructed and arranged to operate substantially as described.

2. In combination with the vibrating lever C, case D, carrying the staple-inserting mechanism described, and the anvil $a$ and gage J $j$, all substantially as and for the purpose described.

3. In a staple-inserting machine constructed to operate substantially as herein described, the staple-guiding grooves $d\ d$, opening vertically into the opposite sides of a wide chamber, H, to adapt the machine to receive and insert a metallic staple, having its head or body portion wider than its shanks, substantially as described.

4. In a staple-inserting machine constructed to operate substantially as described, an open slot, D′, in the face of the case D, to adapt it to receive and insert a suspending staple, having an extended or looped head, as herein set forth.

5. In combination with the case D and plunger F, with mechanism, substantially as described, for receiving and inserting a staple, an anvil, $a$, having in its face a sunken channel or concavity, $e$, with a shallow flat transverse groove, $h$, having its ends curved upward into the flaring sides of said channel or concavity, so that a single blow upon the plunger will insert and completely clinch the shanks of the staple, as herein set forth.

6. In a staple-inserting machine constructed to operate substantially as herein described, the face of the anvil $a$, so sunken or concaved as to adapt it to receive below its top surface the foot of the plunger F and that portion of the article being bound, to assist in the clinching of the staple-legs, substantially as herein set forth and described.

7. In a staple-inserting machine constructed to operate substantially as herein set forth, a plunger, F, with four feathers fitting into four guiding-grooves, as shown, in combination with an anvil having across its concave face two grooves, $h'\ h'$, as shown, for the purpose of inserting and clinching a two-pronged staple on transverse lines or a four-pronged staple, substantially as described.

8. In a staple-inserting machine constructed to operate substantially as described, the case D, adapted to receive and hold a staple, and containing mechanism for inserting and clinching the same, as described, mounted on the end of a vibrating lever, adapted to be raised to and stand in a suitable position for placing the staple therein, substantially as shown and described.

9. In a staple-inserting machine constructed to operate substantially as described, the plunger F, having the lower portion of its opposite sides provided with the feathers $g\ g$, to fit and move in the vertical grooves $h\ h$, formed in the opposite sides of the chamber H, and its face mortised or grooved in a manner to throw the pressure of the plunger principally upon the shoulders of the staple being operated upon, substantially as shown and described.

In testimony whereof I have signed my name to this specification in the presence of the subscribing witnesses.

GEORGE W. McGILL.

Witnesses:
 HENRY SCOTT,
 FRANK S. SCRIMGEOUR.